(12) United States Patent
Horn et al.

(10) Patent No.: US 6,370,171 B1
(45) Date of Patent: Apr. 9, 2002

(54) LASER MACHINE TOOL

(76) Inventors: Armin Horn, Krebenstrasse 7, 71272 Renningen; Klaus Fissler, Asperger Weg 8, 71732 Tamm, both of (DE)

( * ) Notice: Subject to any disclaimer, the term of this patent is extended or adjusted under 35 U.S.C. 154(b) by 0 days.

(21) Appl. No.: 09/400,394

(22) Filed: Sep. 21, 1999

(30) Foreign Application Priority Data

Sep. 21, 1998 (DE) .......................... 298 16 879

(51) Int. Cl.⁷ .............................. H01S 3/13; H01S 3/04
(52) U.S. Cl. .................. 372/34; 372/29.01; 372/29.014
(58) Field of Search ................. 372/34, 29.01, 372/29.014; 250/586

(56) References Cited

U.S. PATENT DOCUMENTS 5,651,904 A * 7/1997 Franke et al. .......... 219/121.69
5,938,953 A    8/1999 Jurca

FOREIGN PATENT DOCUMENTS

| DE | 371 0816 A | 10/1988 |
| DE | 196 30 437 | 7/1996 |
| JP | 63212080 | * 5/1988 |

OTHER PUBLICATIONS

Heinz Haferkamp et al "Prozessintegrierte Qualitatsprufung beim Plasma—und Laserstrahlschneiden" VDI–Z 140 (1998) Nr. 6—Juni XP–002126313 Dusseldorf.

* cited by examiner

*Primary Examiner*—Frank G. Font
*Assistant Examiner*—Armando Rodriguez
(74) *Attorney, Agent, or Firm*—Pepe & Hazard LLP (57) ABSTRACT

A laser assembly has at least one optic element (6, 8) in the path of the laser beam (5) and at least partially permeable to the laser beam (5). There is at least one component for detecting the temperature of the optic element (6, 8) or which can detect the intensity of the light beamed by the optic element (6, 8). The laser beam (5) can be controlled to influence the temperature of the optic element (6, 8) depending upon the light intensity detected.

20 Claims, 6 Drawing Sheets

LASER MACHINE TOOL

BACKGROUND OF THE INVENTION

The invention concerns a laser assembly arrangement, preferably a laser machine tool, with at least one optic element, for example at least one output and/or at least one focusing lens, which is arranged in the path of the laser beam and is at least partially permeable to the laser beam.

Laser arrangements of the type described have already been in use for a long time. The optic element or elements are functionally necessary for the laser arrangement.

Various types of monitoring and control devices are used on known laser tooling machines to guarantee high-quality machining results. For example, DE-A-37 10 816, DE-A-196 30 437 and an article by Haferkamp et al. in the journal VDI-Z No. 6, 1998, pp. 76 et seq. (Springer-VDI-Verlag GmbH & Co. KG, Duesseldorf, Germany) disclose devices connected to machine control for monitoring the place being machined on the workpiece in question. The place being machined is monitored through the focusing lens on the tooling head of the machine. The laser machine tool is controlled depending on the results of the observation. The devices already known use the known principle that the beam reflected or emitted by the workpiece at the machining point makes it possible to determine information about the machining process, and especially about the machining results.

This invention is devoted to solving a problem that is different from this.

In practice it is known that optic elements in laser assemblies, especially focusing lenses of laser tooling machines, become dirty in the course of operation due to deposits, like plasma coming from the machining point of the laser beam. As a result of the dirt, the optic element in question absorbs some of the laser beam passing therethrough. This leads to heating of the optic element which can cause evaporation of the material of the lens, especially in today's high-powered lasers.

The goal of this invention is to remedy this problem.

SUMMARY OF THE INVENTION

The present invention solves this problem by providing at least one device for detecting the temperature of at least one of the optic elements of a laser assembly of the type mentioned at the beginning. It includes a component for detecting the intensity of the light emitted by the optic element in question so that the laser beam can be controlled in a way that affects the temperature of the optic element in question depending upon the light intensity detected. As soon as the temperature detected for the optic element being monitored reaches a value close to its evaporation temperature and a corresponding light intensity is detected, the laser beam is controlled in such a way as to preclude any further heating of the optic element. Control of the laser beam can consist, for example, of deflecting or reducing the energy of the beam and/or in turning the laser beam off. Reference to controlling the power of the laser beam as used herein includes both reducing the power of the beam and terminating the beam. Depending on the corresponding control, the optic element in question can be exchanged for a fully functioning optic element.

The use of the intensity of the light emitted by the optic element in question as a parameter for the temperature being detected or monitored has the advantage that the device used for temperature detection or monitoring can be arranged at a distance from the optic element, outside the path of the laser beam and thus in a variable spatial arrangement. Special devices for connecting the optic element to the detection or monitoring device, in the form of separate connecting lines, are not necessarily needed.

In addition, the light detected can be adjusted with a lower expenditure of interfering radiation than any invisible heat radiation produced such as that generated in machining the workpiece. This type of interfering radiation occurs, for example, with light that comes not from the optic element being monitored, but rather from its environment, but which nevertheless spreads out in the direction of the device for detecting the intensity of the light beamed by the optic element being observed.

Different technical solutions are conceivable according to the invention to detect the intensity of the light beamed by the optic element in question. The use of a camera would be possible, for example; according to the invention, a device that has at least one photosensitive sensor is preferred. A fiber optic cable can be used to monitor the optic element and a camera or a photosensitive sensor can be provided at the end of the cable.

In the interest of the optimal functionality and maximum operating safety of the device for monitoring the optic element or elements in question and thus in the interest of optimum functionality and maximum operating safety of the whole laser arrangement, the improvement in the invention provides that the device for detecting the intensity of the light emitted by the optic element in question, if necessary specifically at least one sensor, be connected to the optic element in question by at least one piece of equipment which enables separation of interfering electromagnetic radiation, especially process light from the light beamed or emitted by the optic element in question. This equipment allows the light beamed by the optic element to pass to the device for detecting the intensity of that light, if need be specifically to at least one sensor, and it stops electromagnetic interfering radiation, especially process light from the light beamed or emitted by the device for detecting the intensity of the optic element in question, if need be specifically from at least one sensor. This procedure ensures that electromagnetic radiation reaches the device for detecting the intensity of the light beamed by the optic element in question, whose intensity directly, but in any case after processing conducted about at a reasonable expense, permits a safe conclusion as to whether the temperature of the optic element being monitored has reached a critical value or will shortly.

In the case of laser assemblies whose laser beam is used as a machining tool, intensive electromagnetic interfering radiation is emitted from the machining point of the laser beam in the form of interfering light radiation. By means of the procedure in the invention described above, the influence of this interfering light radiation is at least kept small during the detection of the intensity of the light beamed by the optic element being monitored.

The invention provide, as a device for separating the electromagnetic interfering radiation, especially process light, and light emitted by the optic element in question, an advantageous improvement at least shielding the device for detecting the intensity of the light emitted by the optic element in question, if need be especially at least one sensor.

According to the invention, the preferred type of shielding is at least one optic filter arranged between the device for detecting the intensity of the light emitted by the optic element in question, if need be especially at least one sensor, and the optic element being monitored. This type of filter is wavelength-related shielding, i.e., shielding by means of which electromagnetic radiation of a certain wavelength or a certain wavelength range can be stopped by the device for detecting the intensity of the light beamed by the optic element in question.

Since light emitted by output or focusing lenses normally has a wavelength that is above 600 nm in magnitude, it may be useful to provide at least one optic filter that is permeable to light with a wavelength that is above 600 nm in magnitude and is impermeable to electromagnetic radiation with a wavelength that is under 600 nm in magnitude.

Those features of the laser arrangement in the invention that are given in the characterizing parts of various claims are used as effective shielding associated with low structural expense, on the device for detecting the intensity of the light emitted by the optic element in question. The claims describe shielding whose effectiveness is based on the arrangement of the device for detecting the intensity of the light emitted by the optic element in question compared to the optic element being monitored and the monitoring channel according to the claims.

Another preferred embodiment of the invention provides that the sensor or at least one of the sensors for detecting the intensity of the light emitted by optic element in question is a diode. These types of diodes are proven, functionally safe components that can be integrated simply into a machine's controls.

Automation of the overheating protection of the optic elements of the laser assembly of the invention is used so that —as in the case of another variation of the invention that is provided—the device for detecting the intensity of the light beamed or emitted by the optic element in question is connected to the machine controls through an evaluation device. The evaluation device has a comparison unit by means of which an actual value assigned to the light intensity detected can be compared with a predetermined reference value. The laser beam can be controlled, depending on the results of the comparison, by means of the controls in a way that affects the temperature of the optic element in question.

The invention's preferred method for controlling the laser beam to protect the optic element in question from overheating consists of shutting off the laser beam. For this purpose, the invention provides that the controls be connected to the laser generator and the latter can be shut off or reduced in power by means of the controls.

The laser assembly in the invention is adjusted to changing requirements in individual cases so that the reference value is variable. Variability of the reference value makes sense since different optic elements may also have different evaporation temperatures, for example.

In the case of the embodiments of the laser arrangement in the invention with sensors in the form of diodes, an actual value assigned to the diode current and/or the diode voltage as the light intensity detected can be compared to a corresponding reference value by means of the comparison unit in the evaluation device.

To prevent malfunctions of the device and protect the optic element in question from overheating, the invention also provides for the evaluation device to have a correction unit, by means of which an actual output value assigned to the light intensity detected can be corrected for interfering influences and the actual adjusted value can be compared with the reference value in question by means of the comparison unit. This basic approach to the solution is translated into the laser assembly in the invention with sensors in the form of diodes. Highly functionally safe overheating protection of the optic element in question is guaranteed when a correction unit according to the claims is provided in combination with one or more of the above-mentioned devices for separating electromagnetic interfering radiation and light emitted by the optic element in question.

The connection between the evaluation device and the control is produced in one preferred embodiment of the invention by a threshold switch, by which the control can be effected by controlling the laser beam, as soon as the actual value assigned to the light intensity detected, if necessary the corrected actual value, exceeds the reference value.

To be able to prevent faulty control of the laser beam, one preferred form of embodiment of the laser arrangement or laser tooling machine in the invention provides that the device for detecting the intensity of the light emitted by the optic element in question and/or the evaluation device can be turned on or off, especially depending on the operating status of the laser assembly or laser machine tool. The possibility of turning off the device for detecting light intensity and/or the evaluation device can be used meaningfully on a laser tooling machine at the time when the laser beam is "plunged" into the workpiece to be machined. This plunging of the laser beam is associated with a jerking evolution of light that could be assigned to the optic element being monitored by the evaluation device of the laser arrangement and would then lead to unfounded control of the laser beam, especially shut down.

In the interest of the greatest possible automation of the operation of the laser arrangement in the invention, the device for detecting the intensity of the light emitted by the optic element in question and/or the evaluation unit and/or the controls are computer-aided.

In one preferred embodiment of the invention, a $CO_2$ laser generator is provided as the laser generator. The laser beam produced by this type of gas laser is not visible and cannot be detected by a photo diode, for example.

BRIEF DESCRIPTION OF THE DRAWINGS

The invention will be explained in greater detail below using schematic drawings of different embodiments.

DETAILED DESCRIPTION OF THE PREFERRED EMBODIMENT

Figure 1:
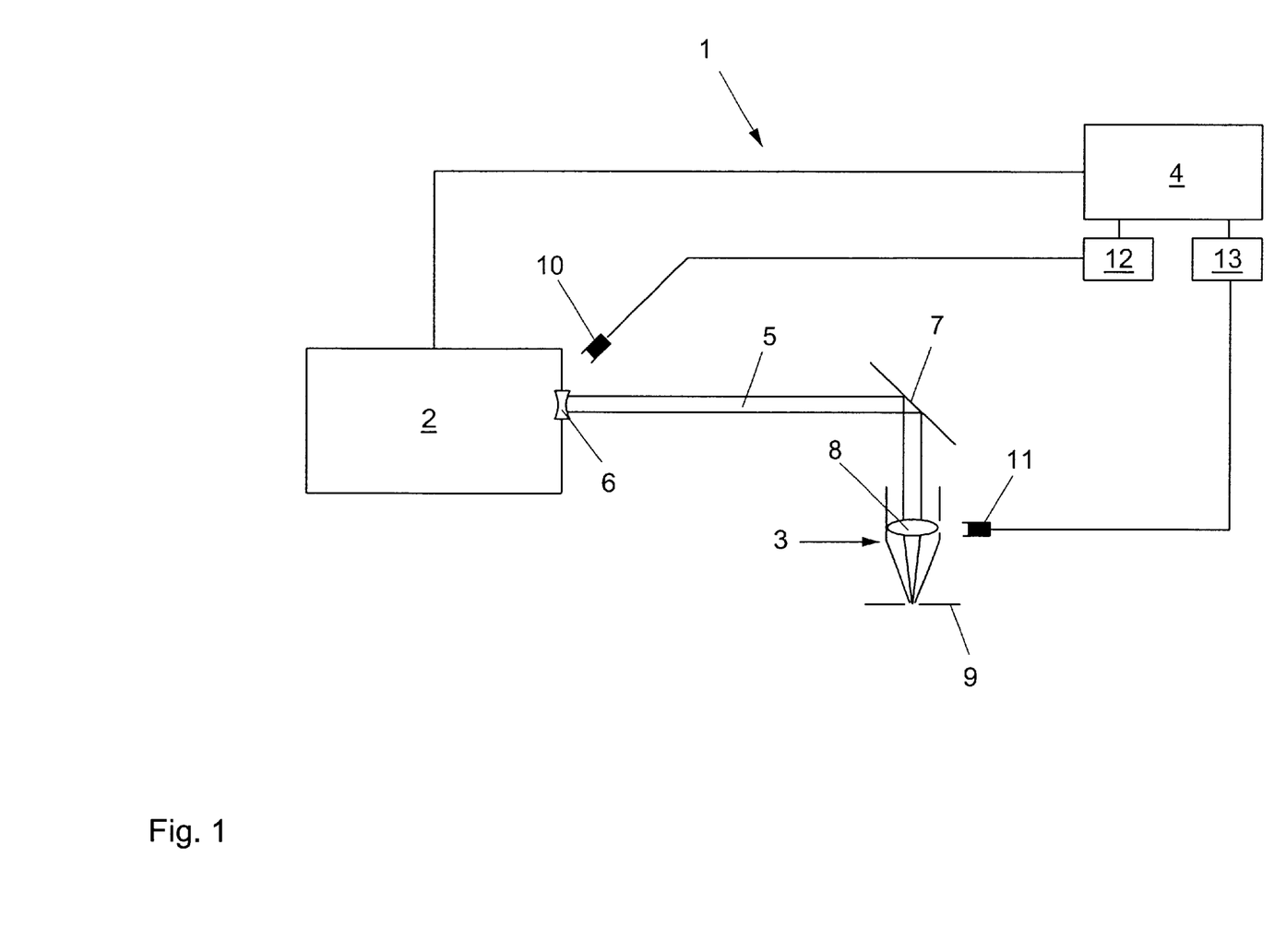
FIG. 1 is a schematic illustration of a laser cutting machine with temperature monitoring of the optic elements, and evaluation devices and machine control in accordance with the present invention.

According to FIG. 1, a laser ASSEMBLY in the form of a laser tooling or cutting machine 1 includes a gas especially a $CO_2$ laser generator 2, a tooling head 3, and controls 4 for the machine. A laser beam 5 is produced in the laser generator 2. In the path of the beam 5 are optic elements in the form of an output lens 6 for the laser generator 2, and a deflection mirror 7 and a focusing lens a are arranged in the tooling head 3. The laser beam 5 is focused on a workpiece 9 to be machined by the focusing lens 8.

The temperature of the output lens 6 and the focusing lens 8 is monitored. Devices for detecting the intensity of the light emitted by the output lens 6 and the focusing lens 8 are used for this. Each of these devices has a photosensitive sensor, namely the photo diode 10 and photo diode 11. Photo diode 10 is connected to the machine controls 4 through an evaluation device 12, and photo diode 12 is connected through the evaluation device 13. In terms of intensity, besides all the light coming out of the optic element being monitored, light exclusively corresponding to a certain wavelength of a certain wavelength range can also be detected.

Figure 2A:
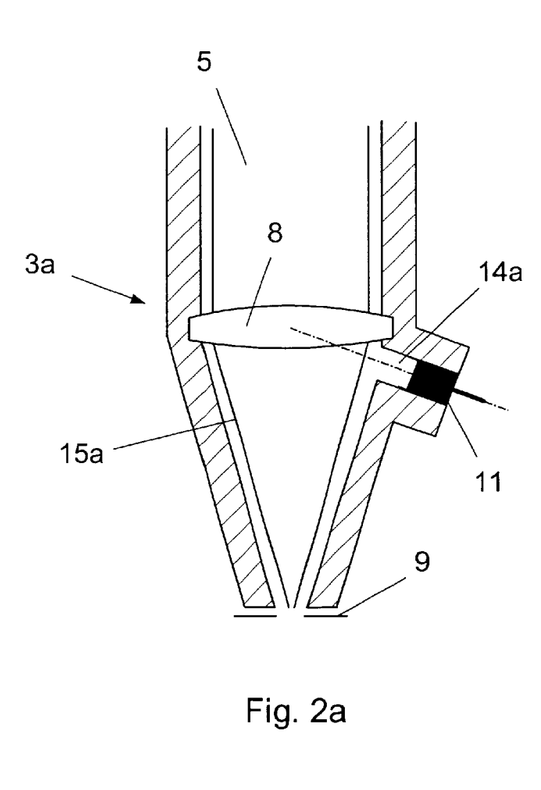
FIGS. 2a–2c are schematic drawings of machine tool heads with focusing lenses and diodes for temperature monitoring.
Figure 2B:
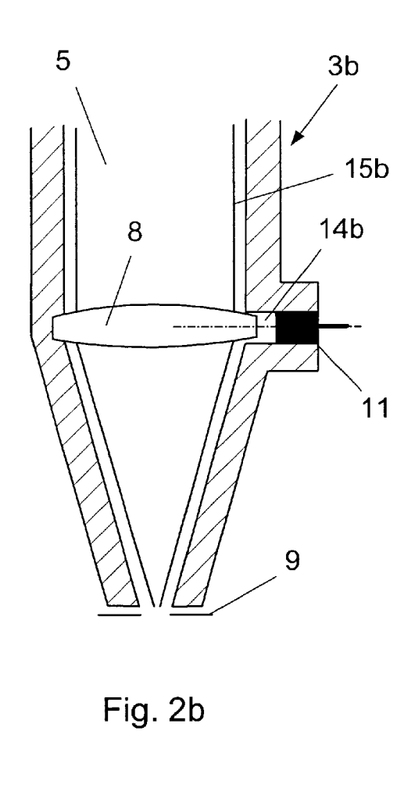
Figure 2C:
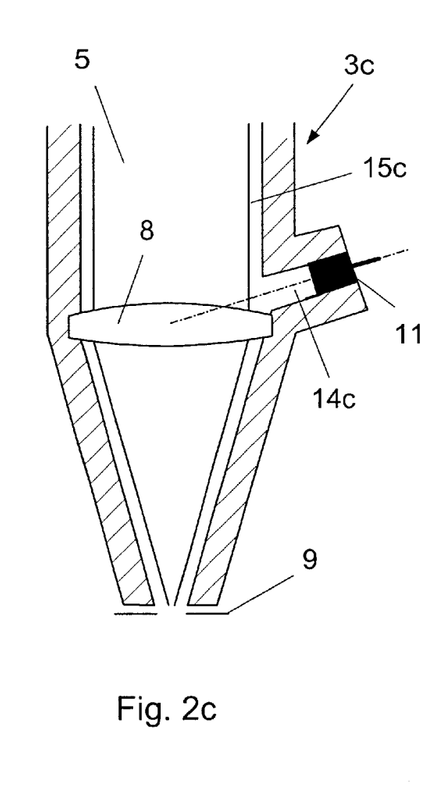

Various ways of arranging the photo diode 11 in relation to the focusing lens 8 can be seen in FIGS. 2a to 2c. In all cases illustrated, the photo diode 11 is placed outside the path of the laser beam 5.

In FIG. 2a, the photo diode 11 is connected to the focusing lens 8 by a monitoring passage 14a which opens into the beam-guidance space 15a in the tooling head 3a on the side of the focusing lens 8 facing the workpiece 9, and it is inclined relative to the focusing lens 8 opposite the axis of the laser beam 5. FIG. 2b shows the photo diode 11 on the end of an observation passage 14b which opens into a beam-guidance space 15b on the tooling head 3b near the focusing lens 8 and extends perpendicularly to the axis of the laser beam 5. In FIG. 2c, the observation channel 14c for the photo diode 11 is on the side of the lens 8 spaced from the workpiece 9 and is connected to the beam-guidance space 15c of the tooling head 3c. The observation channel 14c has an axis which is at an angle to the axis of the laser beam 5.

The observation passages 14a, 14b, 14c allow an arrangement of the photo diode 11 in a position spaced from the laser beam 5, and in which it is largely shielded from light radiation from the focus point of the laser beam 5 on the workpiece 9.

Figure 3:
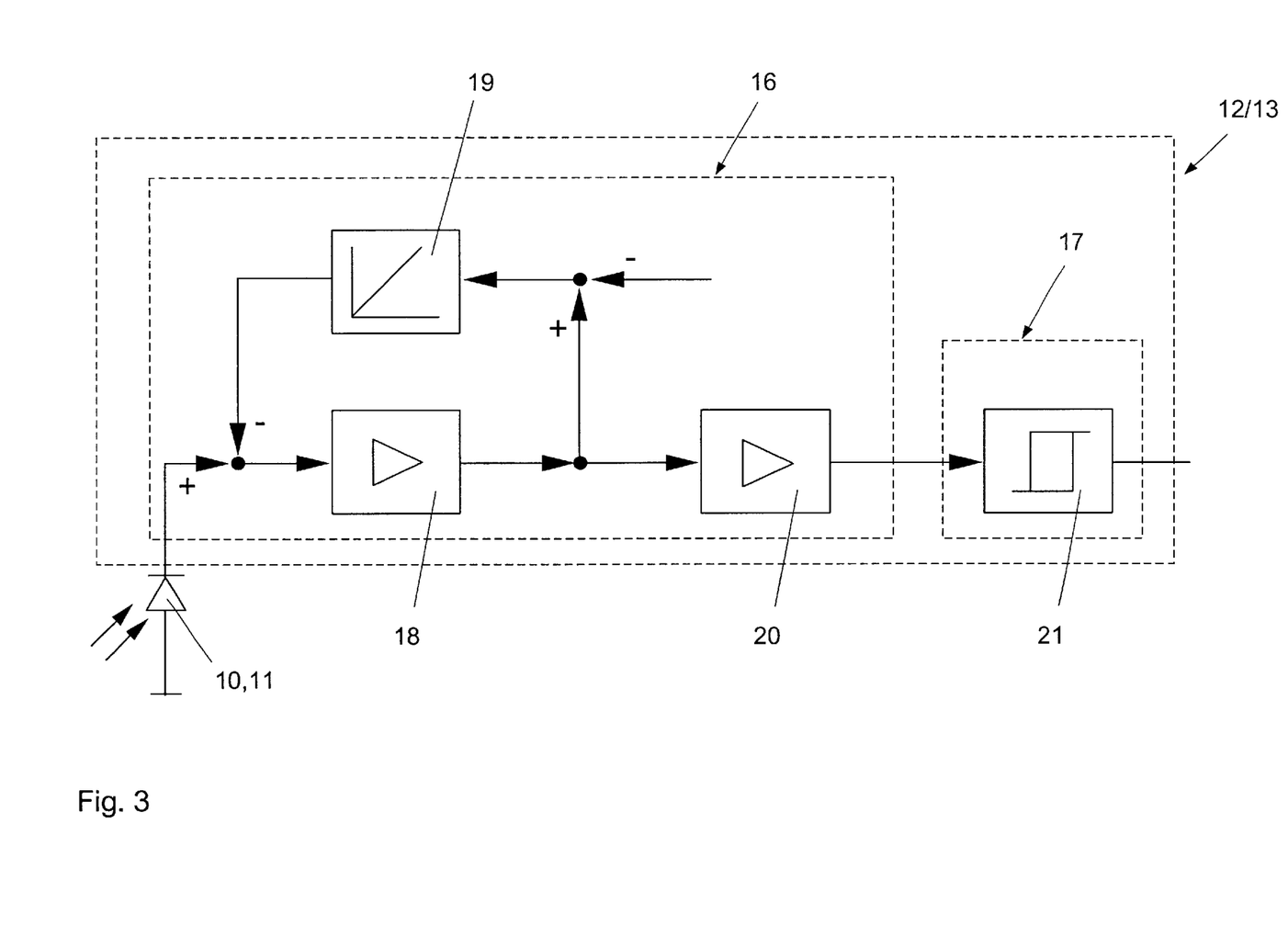
FIG. 3 illustrates the basic design of the evaluation devices of FIG. 1 with accompanying photo diodes.

FIG. 3 is a schematic block diagram showing the evaluation device 12 connected to the photo diode 10 and the evaluation device 13 connected to the photo diode 11. Each evaluation device 12, 13 includes a correction unit 16 and a comparison unit 17. The correction unit 16 contains basically a first amplifier 18, an integrating element 19 and a second amplifier 20. The comparison unit 17 is made up of a threshold switch in the form of a corresponding threshold circuit 21.

Figure 4:
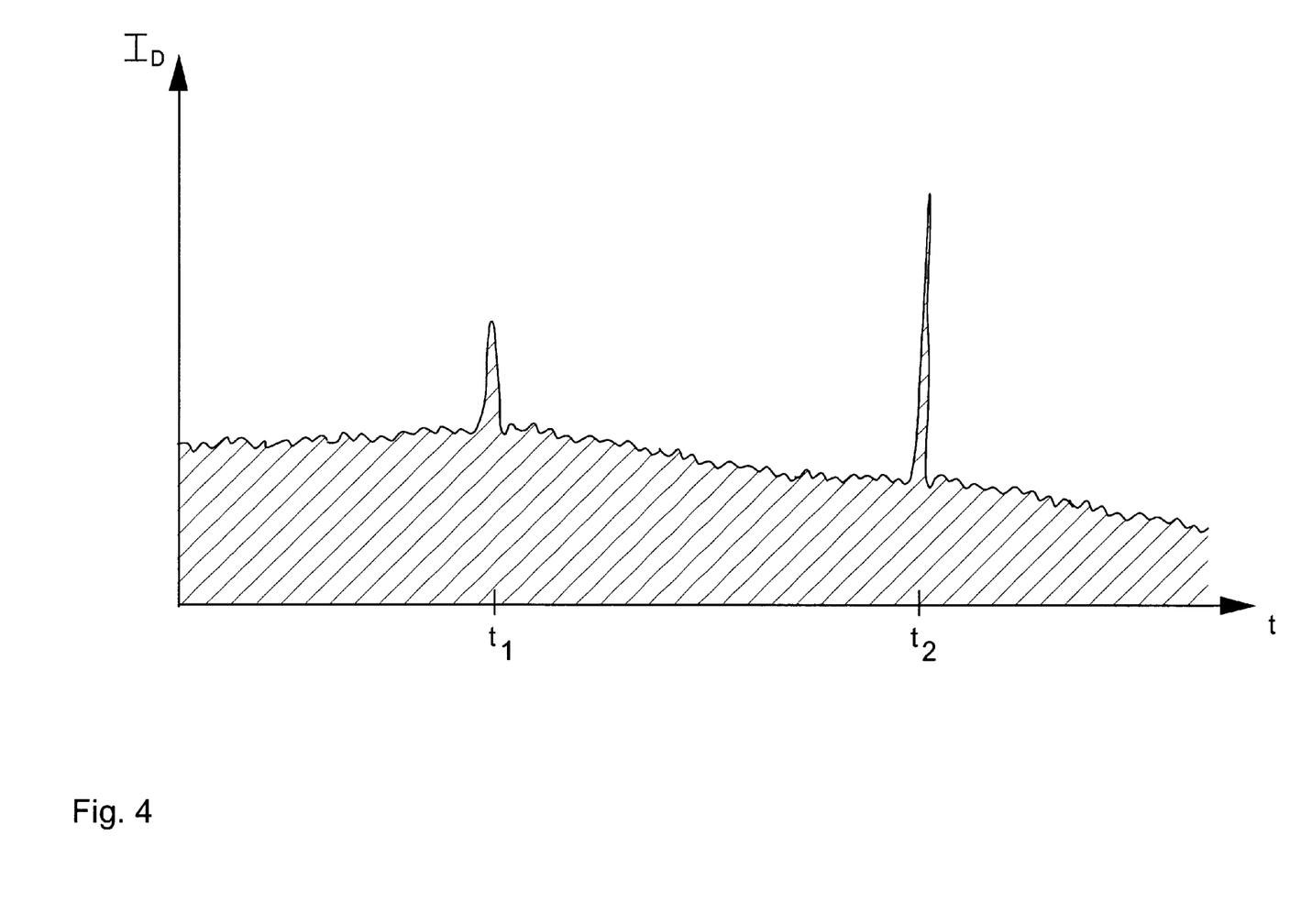
FIG. 4 illustrates the time-dependent level of the diode current from the photo diode in FIG. 3.

The level of the diode current $I_D$ over the time t is shown in FIG. 4 The diode current $I_D$ is caused, for one thing, by the light radiation impinging upon the photo diodes 10, 11, Some of the diode current $I_D$ is also caused by the inherent temperature of the photo diodes 10, 11, which is in turn determined by the ambient temperature of the photo diodes 10, 11. The light radiation impinging upon the photo diodes 10, 11 comes from various sources. One source is the optic element observed by means of the photo diodes 10, 11. In the case of the photo diode 10, this is the output lens 6; in the case of the photo diode 11, this is the focusing lens 8. The intensity of this light radiation and thus the proportion of diode current $I_D$ is dependent upon the temperature of the optic element in question. Moreover, general ambient light radiation which does not come from the output lens 6 or the focusing lens 8 also impinges upon the photo diodes 10, 11 which in turn also generates a proportion of the diode current $I_D$.

The laser beam 5 on the laser cutting machine 1 is controlled in such a way that evaporation of the output lens 6 and the focusing lens 8 is precluded; only that part of the diode current $I_D$ is relevant here which is caused by the brightness ratios on the output lens 6 and on the focusing lens 8. The other light radiation is interfering radiation; accordingly the part of the diode current $I_D$ attributable to this interfering radiation is an interfering current. That part of the diode current $I_D$ that is caused by the inherent temperature of photo diode 10 or 11 is also an interfering current. The sum of the interfering currents is called the "dark current."

FIG. 4 now shows the time-dependent level of the actual value of the total diode current $I_D$, hence including the dark current portion. Here, the value of the abscissa t, marks the point in time when the laser beam 5 impinges upon the workpiece 9, which is associated with a jerking light, and the value of the abscissa $t_2$ marks that point in time when the output lens 6 or the focusing lens 8 has reached a temperature near its evaporation temperature.

The correction unit 16 of the evaluation devices 12, 13 is used to correct the actual value of the diode current $I_D$ in FIG. 4 for the proportion of dark current. The proportion of dark current of the signal depending on the diode current $I_D$ coming from the photo diodes 10, 11 and flowing from them is filtered out in the first amplifier 18. Amplifier 18 is designed as a differential amplifier, where portions of the low-frequency signal are fed back to the reference point by the integrating element 19. The resulting signal is amplified in the second amplifier phase 20 and then fed back to the threshold circuit 21. If the strength of the signal fed to the threshold circuit 21 exceeds a predetermined reference value in the threshold circuit 21, it is forwarded as a digital signal to the machine control 4. The reference value in the threshold circuit 21 represents the temperature of the output lens 6 or the focusing lens 8, at which the optic element in question is not yet evaporating. The digital signal forwarded to the machine control 4 causes the laser generator 2 to be shut off by the machine control 4 and with it the laser beam 5. The output lens 6 or the focusing lens 8, which is no longer functioning, can then be changed.

Figure 5A:
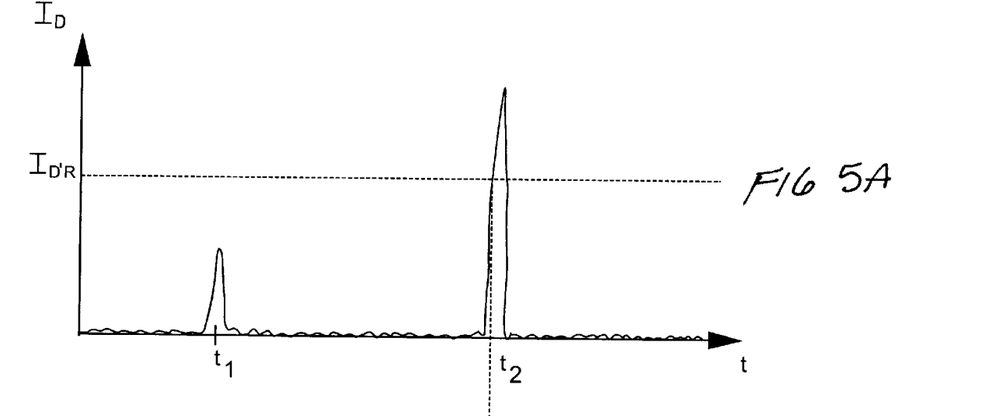
FIGS. 5a–5c are diagrams which illustrate the control of the laser cutting machine of FIG. 1.

FIG. 5 shows in the top plot the time-dependent level of the actual value of the diode current $I_D$ corrected for the dark current portion. The value of the ordinate $I_{D'R}$ is the corrected diode current actual value for the output lens 6 and the focusing lens 8 shortly before evaporation, which is consequently assigned as a reference value to the shut-off time $t_2$ of the laser generator 2.

Figure 5B:
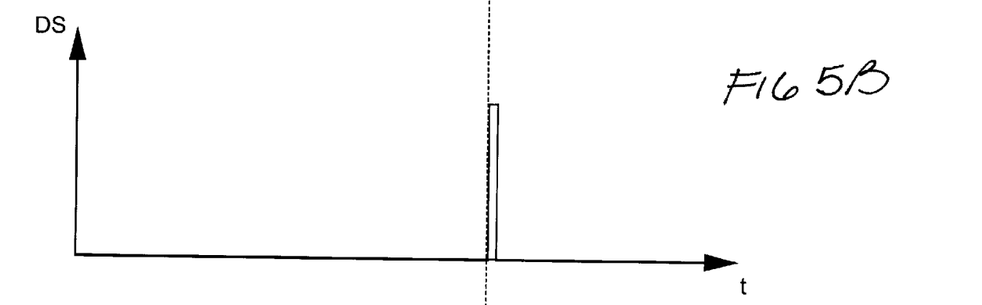
Figure 5C:
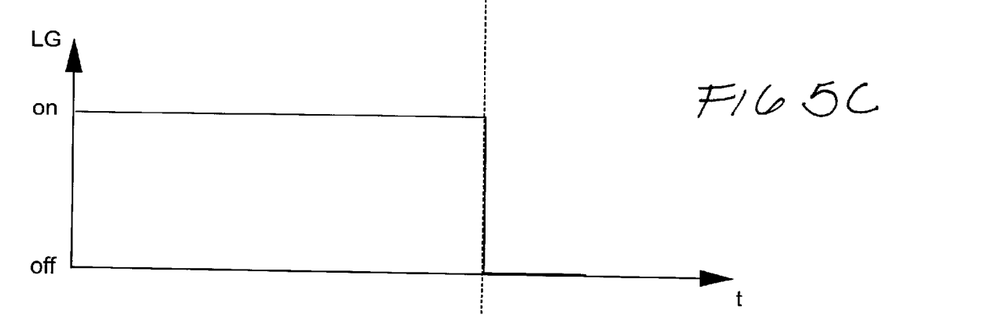

The middle plot in FIG. 5 shows the time dependence of the digital signal DS assigned to the machine control 4 to turn off the laser generator 2. The bottom plot in FIG. 5 shows the laser generator 2 (LG) status when turned on over the time t.

Figure 6:
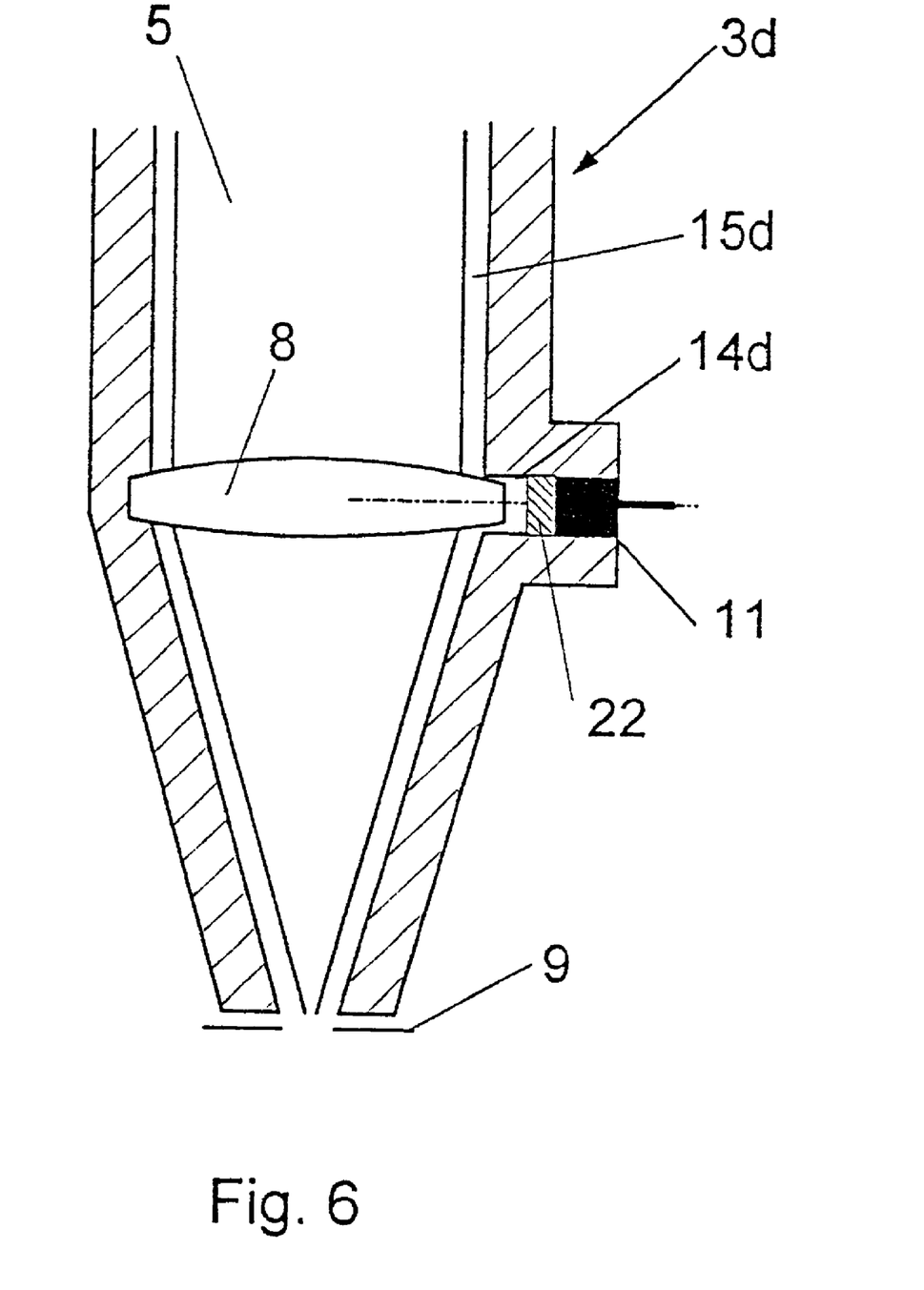
FIG. 6 is a schematic drawing of a tool head with a focusing lens, accompanying temperature control and an optic filter.

Finally, FIG. 6 shows a tool head 3d, which is largely identical in design to the tool head 3b in FIG. 2b. Also in the case of tool head 3d, the photo diode 11 of the device for detecting the intensity of the light emitted by the focusing lens 8 is at the end of an observation passage 14d which extends perpendicularly to the axis of the laser beam 5 and opens into the beam-guidance space 15d near the focusing lens 8. Like tool heads 3a, 3b, 3c in FIGS. 2a, 2b, 2c, the tool head 3d can also be used on a laser cutting machine of the type shown in FIG. 1.

Unlike the tool heads 3a, 3b, 3c described hereinbefore, an optic filter 22 is provided in tool head 3d in FIG. 6, and it is disposed in front of the photo diode 11 toward the focusing lens 6 to be observed. This optic filter 22 is a longpass filter, i.e., an optic filter with a low degree of transmission in the area of relatively lower wavelengths and a high degree of transmission in the area of relatively high wavelengths. More specifically, light radiation with a wavelength that is above 600 nm in magnitude is let through by the optic filter 22 to the photo diode 11; electromagnetic radiation with a wavelength that is below 600 nm in magnitude is filtered out by the optic filter 22. The background for these dimensions for the blocking limit and the permeable limit of the optic filter 22 is the fact that the wavelengths of the radiation coming from the tool machining site of the laser beam 5 on the workpiece 9, especially the wavelengths of so-called "process light," is mainly in the range under 600 nm in frequency, while the so-called "lens light" beamed by the focusing lens 8 has wavelengths that are above said value in frequency.

The optic filter 22 fully covers the photo diode 11 in the tooling channel 14*d* and thereby shields it, thus making sure that the only light radiation that reaches photo diode 11 is basically that which comes from focusing lens 8 being observed, and its intensity is a measure of the lens temperature being monitored. The light radiation hitting photo diode 11 on the tooling head 3*d* in FIG. 6—as already described above—generates a diode current. This signal or one corresponding to it can then be compared in the comparison unit, for example the threshold circuit 21 described above, with a reference value, and the results of the comparison can then be used as a basis for controlling the laser cutting machine in question. In the interest of optimum functionality or maximum operating safety of the temperature monitoring of the focusing lens 8, the diode current flowing to photo diode 11 or the signal corresponding to it, preferably works in the way described in FIG. 3 and corrects interfering portions. The corrected actual value of the diode current or the corrected signal can then be used, as described, as the basis for controlling the laser cutting machine. Determining the "dark current" portion of the diode current generated by the light hitting photo diode 11 is relatively simple. Detecting the light intensity offers a practical way of monitoring the temperature of the optic element concerned at a relatively low expense.

Having thus described the invention, what is claimed is:

1. A laser assembly with at least one optic element (6, 8) disposed in the path of the laser beam (5) and at least partially permeable to the laser beam (5), characterized by the fact that the assembly includes at least one device for detecting the temperature of said optic element (6, 8), said device including a component for detecting the intensity of the light emitted by said optic element (6, 8) as a result of its temperature, and control means whereby the power of the laser beam (5) is controlled depending upon the light intensity detected to influence the temperature of said optic element (6, 8).

2. The laser assembly in accordance with claim 1, characterized by the fact that said component for detecting the intensity of the light emitted by said optic element (6, 8) has at least one photosensitive sensor.

3. The laser assembly in accordance with claim 1 characterized by the fact that said component for detecting the intensity of the light emitted by said optic element (6, 8) includes at least one sensor operatively connected to said optic element (6, 8) and at least one component for separating interfering electromagnetic radiation from the light emitted by said optic element (6, 8).

4. The laser assembly in accordance with claim 3 wherein said component for separating interfering radiation includes at least one shield for said component for detecting the intensity of the light emitted by said optic element (6, 8).

5. The laser assembly in accordance with claim 4 wherein said shield comprises at least one filter (22) between said detection component device and said optic element (6, 8).

6. The laser assembly in accordance with claim 1 wherein said component for detecting the intensity of the light emitted by said optic element (6, 8) is disposed outside the path of the laser beam (5) and is operatively connected to said optic element (6, 8) being observed by an observation passage (14*a*, 14*b*, 14*c*, 14*d*) which is disposed at an angle to the axis of the laser beam (5).

7. The laser assembly in accordance with claim 6 wherein said observation passage (14*b*, 14*d*) extends perpendicularly to the axis of the laser beam (5).

8. The laser assembly in accordance with claim 6 wherein a beam-guidance space (15*a*) is provided for the laser beam (5), and said observation passage (14*a*) opens into the beam-guidance space (15*a*) on the side of said optic element (6, 8) facing the workpiece (9) and said passage is disposed at an angle toward said optic element (6, 8) opposite the axis of the laser beam (5).

9. The laser assembly in accordance with claim 3 wherein said sensor is a diode (10, 11).

10. The laser assembly in accordance with claim 1 characterized by the fact that said device for detecting the intensity of the light emitted by said optic element (6, 8) is connected to said control means (4) by an evaluation device (12, 13) which includes a comparison unit (17) by which an actual value assigned to the light intensity detected is compared with a predetermined reference value and wherein the laser beam (5) is controlled by means of said control means (4) to influence the temperature of said optic element (6, 8) depending on the results of the comparison.

11. The laser assembly in accordance with claim 10 characterized by the fact that said reference value is variable.

12. The laser assembly in accordance with claim 1 characterized by the fact that said control means (4) is connected to said laser generator (2) and can terminate its operation.

13. The laser assembly in accordance with claim 1 characterized by the fact that said detection component includes a diode and wherein an actual value assigned to the diode current and/or the diode voltage is compared with a corresponding reference value by means of a comparison unit (17) in an evaluation device (12, 13) as the actual value assigned to the light intensity detected.

14. The laser assembly in accordance with claim 13 characterized by the fact that said evaluation device (12, 13) has a correction unit by means of which an initial actual value assigned to the light intensity detected is corrected for interfering factors and the corrected actual value is compared with the reference value by means of said comparison unit (17).

15. The laser assembly in accordance with claim 14 characterized by the fact that said correction unit (16) in said evaluation device (12, 13) operates to correct an actual value assigned to the diode current flowing to the diode (10, 11) and/or the diode voltage at the diode (10, 11) by a value for the diode current or diode voltage caused by interference factors including ambient temperature, ambient light of the diode (10, 11), and process light, whereby the corrected actual value is the actual value to be compared with the reference value by said comparison unit (17).

16. The laser assembly in accordance with claim 15 wherein said comparison unit (17) of said, evaluation device (12, 13) has a threshold switch (21) whereby said evaluation device (12, 13) is connected to the control means (4) and whereby the control means (4) controls the laser beam (5) as soon as the actual value assigned to the light intensity detected exceeds the reference value.

17. The laser assembly in accordance with claim 14 characterized by the fact that said device for detecting the intensity of the light beamed by said optic element (6, 8) and/or said evaluation device (12, 13) is turned on and off.

18. The laser assembly in accordance with claim 17 characterized by the fact that said device for detecting the intensity of the light emitted by said optic element (6, 8), the evaluation device (12, 13) and said control means (4) are computer-aided.

19. A laser assembly including a laser generator for generating a laser beam and at least one optic element (6, 8), disposed in the path of the laser beam (5) and at least partially permeable to the laser beam (5), characterized by the fact that the assembly includes at least one device for detecting the temperature of said optic element (6, 8), said device including a component for detecting the intensity of the light emitted by said optic element (6, 8) as a result of its temperature, and control means whereby the laser beam (5) is controlled depending upon the light intensity detected to influence the temperature of said optic element (6, 8), said control means (4) being connected to the laser generator (2) and operable to terminate its operation.

20. A laser assembly including a laser generator for generating a laser beam and at least one optic element (6, 8) disposed in the path of the laser beam (5) and at least partially permeable to the laser beam (5), characterized by the fact that the assembly includes at least one device for detecting the temperature of said optic element (6, 8), said device including a component for detecting the intensity of the light emitted by said optic element (6, 8) as a result of its temperature, and control means whereby the laser beam (5) can be controlled depending upon the light intensity detected to influence the temperature of said optic element (6, 8), said detection component including a diode and wherein an actual value assigned to the diode current and/or the diode voltage can be compared with a corresponding reference value by means of a comparison unit (17) in an evaluation device (12, 13) as the actual value assigned to the light intensity detected, said evaluation device (12, 13) having a correction unit by means of which an initial actual value assigned to the light intensity detected is corrected for interfering factors and the corrected actual value is compared with the reference value by means of said comparison unit (17), said device for detecting the intensity of the light beamed by said optic element (6, 8) and/or the evaluation device (12, 13) can be turned on and off.

* * * * *